E. R. Dobbs,
Automatic Gate,

No. 63,710.  Patented Apr. 9, 1867.

Witnesses:
Theo Tusche
Wm Treurn

Inventor:
E. R. Dobbs
Per Munn & Co
Attorneys

United States Patent Office.

E. R. DOBBS, OF POUGHKEEPSIE, NEW YORK.

*Letters Patent No. 63,710, dated April 9, 1867.*

---

IMPROVEMENT IN GATES.

---

The Schedule referred to in these Letters Patent and making part of the same.

---

TO ALL WHOM IT MAY CONCERN:

Be it known that I, E. R. DOBBS, of Poughkeepsie, in the county of Dutchess, and State of New York, have invented a new and improved Gate; and I do hereby declare that the following is a full, clear, and exact description thereof, which will enable others skilled in the art to make and use the same, reference being had to the accompanying drawings, forming part of this specification.

This invention relates to a new and improved gate of that class which are opened automatically by a vehicle in its passage to the gate, and closed automatically by the vehicle in leaving the gate after having passed through it. The object of this invention is to obtain a simple means to effect this end, and one which may be economically constructed and applied, and which will operate in the most efficient manner. In the accompanying sheet of drawings—

Figure 1:
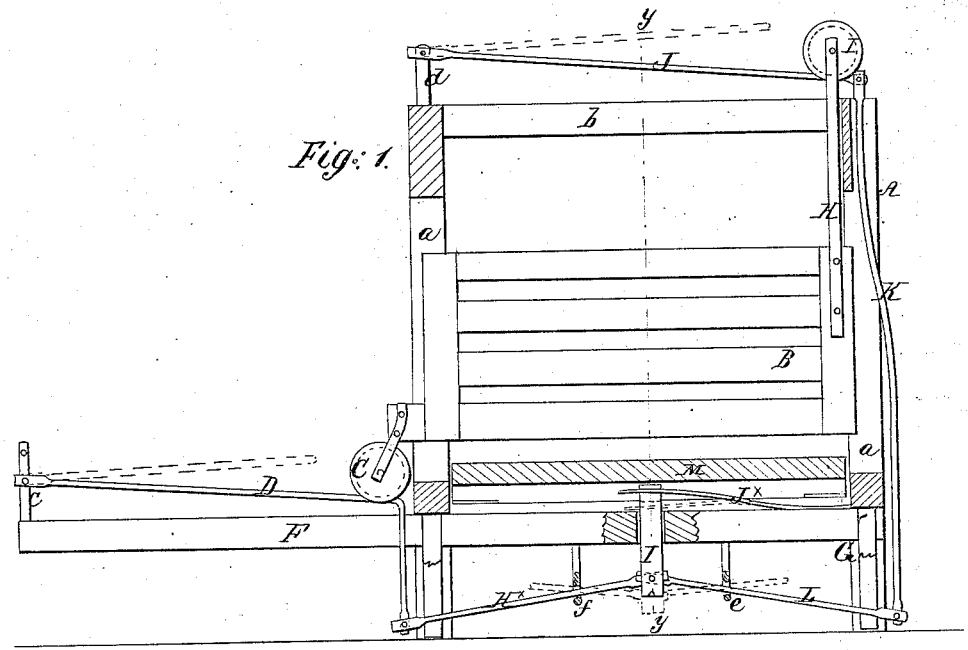
Figure 2:
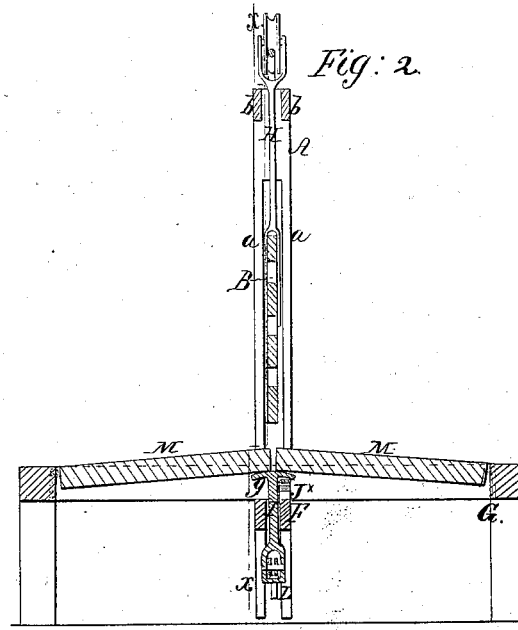

Figure 1 is a sectional elevation of my invention taken in the line $x$ $x$, fig. 2.

Figure 2, a transverse vertical section of the same taken in the line $y$ $y$, fig. 1.

Similar letters of reference indicate like parts.

A represents an upright framing, in which the gate B works and is properly supported, said framing being composed of two uprights, $a$, at each side, connected at their upper ends by two parallel cross-pieces, $b$ $b$. The gate B slides between the uprights $a$ $a$ and is supported by the same. To the lower part of the gate B, at one end of the same, there is attached a wheel, C, having a grooved periphery to run on a way, D, which is constructed of a rod, the outer end of which is pivoted to an upright, $c$, at one end of a bar, F, which projects from a horizontal framing G in which the framing A is secured, (see fig. 1.) To the opposite end of the gate B, at its upper part, there is attached an upright bar, H, having a wheel, I, in its upper end provided with a grooved periphery which runs on a way, J, pivoted at one end to an upright, $d$, at the upper end of two of the uprights $a$ $a$ of the framing A, as shown clearly in fig. 1. The end of the way J, opposite to the pivoted end, is connected by a pivot to an upright rod, K, which extends down by one side of the horizontal framing G, and is pivoted to a lever, L, which passes through an eye, $e$, secured to the under side of the bar F, and the inner end of the way D is bent or curved so that it may extend down by the opposite side of the horizontal framing G, and its lower end is pivoted to the outer end of a lever, H*, which passes through an eye, $f$, in the bar F. These two levers L H* are in line with each other, the eyes $e f$ serving as fulcra for the same, as will be fully understood by referring to fig. 1; and the inner ends of the levers are pivoted to a vertical bar, I, which passes loosely through the bar F, and has a cross-head, $g$, on its upper end; and a spring, J*, which is attached to the upper surface of F, bears against the under side of the cross-head and has a tendency to keep the bar I elevated and the ways D J inclined, as shown in fig. 1, so as to keep the gate B in a closed state, it being understood that the gate B rests upon the ways or is supported by them. At each side of the gate there is a platform, M, the inner edges of which rest upon the cross-head $g$ of the bar I, the outer edges being hinged to the framing G. The gravity of the gate B, it will be seen, in addition to spring J*, has a tendency to keep it in a closed state.

From the above description it will be seen that a vehicle in approaching the gate at either side will by its gravity depress a platform, M, and thereby throw up the outer ends of the levers L H* and reverse the inclination of the ways D J, as shown in red in fig. 1, and the gate will consequently slide out from between the uprights $a$ of the framing A, so that the vehicle may pass through, the gate closing as soon as the vehicle leaves the platform at the opposite side of the gate from that where it was opened, the platforms of course being raised under the influence of the spring and the ways D J inclined to the original position, as shown in blue tint, and the gate will close. The levers L H* and bar I may be fitted in a chamber of wood or masonry in the earth underneath the gate. The horizontal wooden framing G is not essential, as the uprights $a$ of the framing A may be sunk directly into the earth.

I claim as new, and desire to secure by Letters Patent—

The pivoted or adjustable ways D J, with gate B resting thereon, in combination with the platforms M M, connected with the ways to operate in the manner substantially as and for the purpose herein set forth.

The above specification of my invention signed by me this 30th day of January, 1867.

E. R. DOBBS.

Witnesses:
WM. F. McNAMARA,
ALEX. F ROBERTS.